United States Patent [19]

Habiger

[11] 3,898,807

[45] Aug. 12, 1975

[54] HYDROSTATIC TRANSMISSION CONTROL SYSTEM

[75] Inventor: Cyril W. Habiger, Joliet, Ill.

[73] Assignee: Caterpillar Tractor Co., Peoria, Ill.

[22] Filed: June 20, 1974

[21] Appl. No.: 481,149

[52] U.S. Cl. .................. 60/391; 60/392; 60/445; 60/488
[51] Int. Cl.² ........................................ F16H 39/46
[58] Field of Search ............ 60/388, 391, 392, 445, 60/462, 463, 465, 487, 390, 399, 60/403, 431, 488

[56] References Cited
UNITED STATES PATENTS

| | | | |
|---|---|---|---|
| 2,864,239 | 12/1958 | Taylor................................ | 60/390 |
| 2,896,411 | 7/1959 | Bowers et al. ..................... | 60/399 |
| 2,954,756 | 10/1960 | Donner et al..................... | 60/388 X |
| 3,359,727 | 12/1967 | Hann et al. ....................... | 60/465 |

*Primary Examiner*—Edgar W. Geoghegan
*Attorney, Agent, or Firm*—Phillips, Moore, Weissenberger Lempio & Strabala

[57] ABSTRACT

A hydrostatic transmission has a variable displacement pump which is driven by the vehicle engine and hydraulically coupled to a fluid motor that operates the drive wheels. An operator's control member may be adjusted from a neutral position to increase pump displacement and thereby effect progressively higher vehicle speeds in a forward direction and if the control member is shifted in an opposite direction, pump displacement passes through neutral and reverses to reverse vehicle direction. The manual control adjustment is realized through a pair of coaxial sleeve valves which also provide follow-up action to normally limit any change of pump displacement to that dictated by the movement of the operator's control. The sleeve valves also counteract a tendency of operators to increase pump displacement when stalling is imminent, by automatically overriding the manual control and decreasing pump displacement when increased loading of the vehicle causes the pump output pressure to rise to a predetermined high level.

12 Claims, 4 Drawing Figures

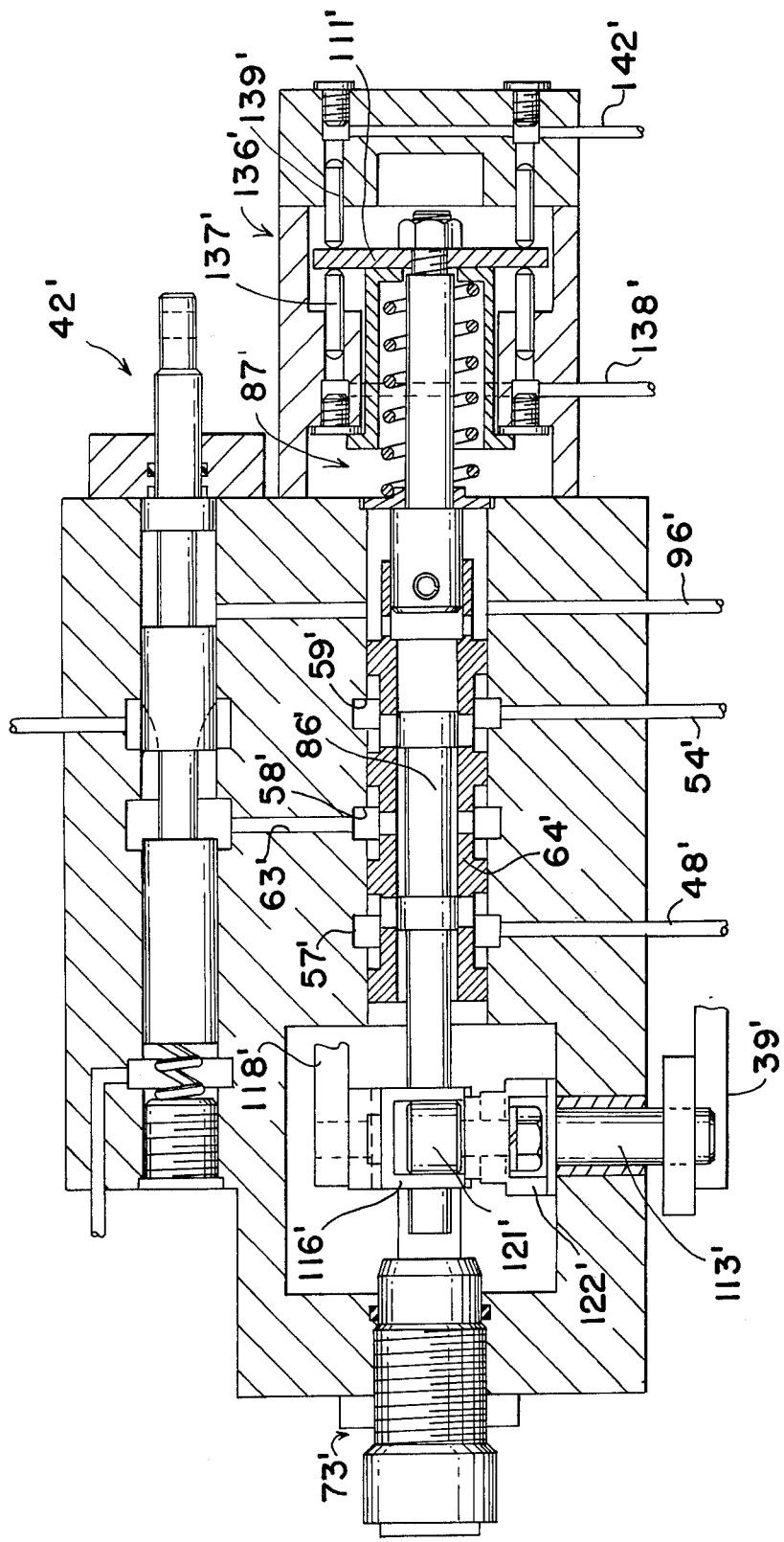

HYDROSTATIC TRANSMISSION CONTROL SYSTEM

BACKGROUND OF THE INVENTION

This invention relates to control systems for reversible variable drive ratio hydrostatic transmissions.

Certain forms of industrial vehicle or earth moving vehicles or the like are often provided with a hydrostatic transmission for coupling the engine to the drive wheels or other running gear of the vehicle. A hydrostatic transmission has a fluid pump driven by the vehicle engine and the output of the pump is transmitted to a fluid motor coupled to the vehicle drive line. If one or both of the pump and fluid motor are of the variable or adjustable displacement form, the effective drive ratio between the engine and drive line may be continuously varied to control ground speed and to adjust to varying loads. If one or both of the pump and motor is of the overcenter variable displacement form, the transmission may be employed for reversing the direction of vehicle travel.

Relative to mechanical transmissions of the kind employing fixed ratio gears, a hydrostatic transmission has the advantage of offering a continuously variable drive ratio and enables simplification of the vehicle controls since it is possible to control speed, drive direction and drive ratio by movement of a single operator's control element. Such a control element may have a neutral position and may be moved in one direction to establish forward drive and to progressively increase drive ratio while being movable in an opposite direction from the neutral position to establish reverse drive at any selected drive ratio within the available range.

In order to change the displacement of the pump or motor, the operator's control member is coupled to a valve which transmits pressurized fluid to actuators at the pump or motor in response to control member movement. To keep the actuators from shifting the displacement to the maximum possible extent at intermediate settings of the operator's control member, follow-up means are customarily provided which feed back actuator motion to the control valve in a negative manner so that actuator motion stops when movement of the operator's control member stops.

Problems have heretofore been encountered in these systems when the load on the vehicle increases to the lug point at which stalling of the vehicle is incipient because the maximum horsepower output of the engine is insufficient to propel the vehicle under the existing conditions. This may occur, for example, as the vehicle starts up a steep slope. As the vehicle begins to slow because of the increased load, the natural tendency of many operators is to shift their control member further in the direction which normally increases vehicle speed. This reaction comes about because most operators are accustomed to operating other vehicles, such as automobiles for example, in which further depression or an accelerator pedal or the like is the proper response to an undesired slowing of the vehicle from increased loading. Such action has an adverse effect on a hydrostatic transmission equipped vehicle of the kind discussed above. Although such a movement would normally increase the engine speed, it also increases the volumetric output of the pump and therefore increases the power required to drive the pump. As the increased power requirement may exceed the available power from the engine, stalling is very likely to result. Under extreme conditions, this can occur even if the operator does not attempt to compensate for the increased loading by moving his control member in the direction which would normally accelerate the vehicle.

This problem may be understood from another standpoint by considering that in an automotive vehicle having an accelerator pedal shiftable a shiftable mechanical transmission, the operator's normal reaction to an undesired slowing from increased loading is first to depress the accelerator pedal in an attempt to maintain speed and if the engine is unable to deliver the needed additional power, he downshifts the transmission in order to obtain higher torque multiplication within the available power limitation. But in a hydrostatic transmission vehicle of the kind discussed above, the same control lever movement which normally increases acceleration is also the movement which in effect upshifts the hydrostatic transmission thereby aggravating the situation.

Accordingly, a hydrostatic transmission control system must adjust pump or motor displacement in response to movement of an operator's control member and provide a follow-up or feedback action in conjunction therewith. The system should also provide for automatic overriding of the manual control in the event of incipient stalling whereby torque multiplication in the transmission is increased under those conditions without regard to the operator's movements of his control member. In order to provide these several functions, prior hydrostatic transmission control systems have tended to be undesirably complex and costly. Typically, several distinct valving elements have been required to accomplish all of the necessary functions.

SUMMARY OF THE INVENTION

This invention provides a hydrostatic transmission control system normally responsive to movement of an operator's control member, for controlling vehicle speed, drive direction and drive ratio and having means which overrides the operator's actions when engine stall conditions are approached to decrease drive ratio independently of the position or movement of the operator's control member at the time such condition occurs. The invention further provides follow-up mechanism for normally limiting any change of pump displacement to that dictated by the position of the operator's control member. These functions are all accomplished through a pair of coaxial sleeve valves which are responsive to the operator's control member and to the follow-up mechanism and to the antistall override means as well.

Accordingly, it is an object of this invention to provide a compact, simplified, and economical system for controlling a vehicle which is equipped with a hydrostatic transmission.

It is another object of the invention to provide a control valve assembly having means responsive to movement to an operator's control member for controlling speed, drive direction and drive ratio in a hydrostatic transmission and having follow-up means and means for controlling the transmission independently of the operator's control lever in the presence of incipient stall conditions wherein a pair of coaxial annular valving elements coact with each such means to enable each such function to be realized.

The invention, together with further objects and advantages thereof, will best be understood by reference

BRIEF DESCRIPTION OF THE DRAWINGS

In the accompany drawings:

FIG. 4 is an axial section view of a modified form of the control valve assembly.

DESCRIPTION OF THE PREFERRED EMBODIMENTS

Figure 1:
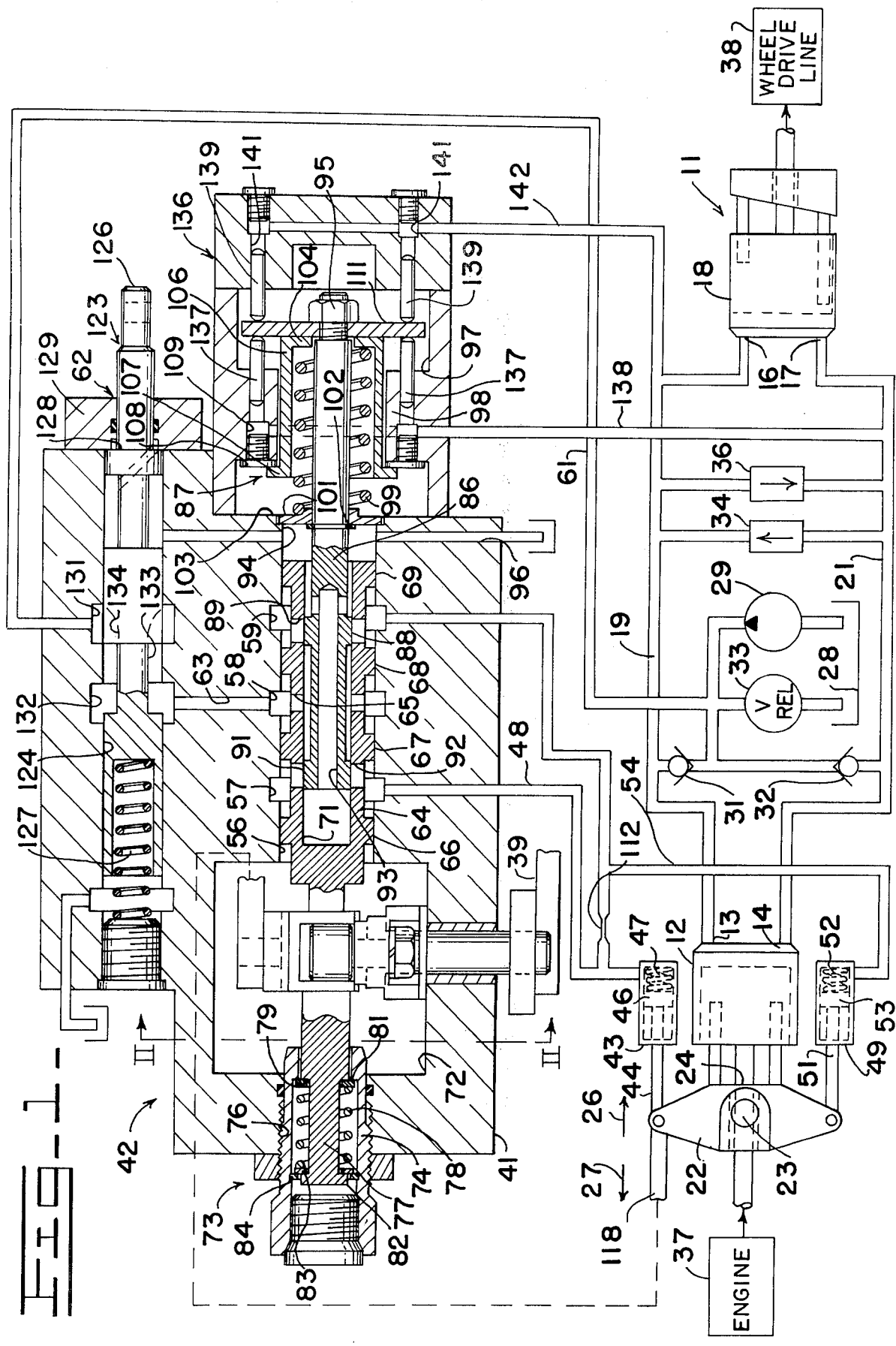
FIG. 1 is s diagrammatic view of a hydrostatic transmission for a vehicle together with an axial section view of a control valve assembly therefor.

Referring now to the drawings and more particularly to FIG. 1 thereof, suitable detailed construction for a hydrostatic transmission 11 is well known to the art and accordingly only certain components thereof are depicted schematically in FIG. 1 to facilitate an understanding of the co-action of the present invention with the transmission. Transmission 11 may include a variable displacement pump 12 of the axial piston type having a pair of fluid ports 13 and 14 respectively coupled to the fluid ports 16 and 17 of a fluid motor 18 through conduits 19 and 21 respectively. Pump 12 is of the overcenter variable displacement form having a cam or swash plate 22 which may be rocked about a pivot 23 to change the inclination of a cam surface 24 which determines the displacement of the pump. With cam surface 24 at right angles to the axis of the pump as shown in FIG. 1, the dislplacement is zero and fluid is not translated between ports 13 and 14. As swash plate 22 is increasingly inclined relative to the axis of the pump in the direction indicated by arrow 26, fluid is translated from port 13 to port 14 at a progressively increasing volume for a given speed of pump rotation. Conversely, as swash plate 22 is progressively inclined in the opposite direction as indicated by arrow 27, fluid is translated from port 14 to 13 with a progressively increasing volume for a given pump speed.

Fluid motor 18 in this example has a fixed displacement and thus the output speed and the drive direction of the motor is determined by the angle of pump swash plate 22 relative to the axis of the pump 12. The pump 12 and motor 18 and interconnecting conduits 19 and 21 are supplied with hydraulic fluid such as oil from a reservoir 28 by a replenishing pump 29 which delivers fluid from the reservoir to conduits 19 and 21 through one way check valves 31 and 32 respectively. A relief valve 33 is connected between the outlet of pump 29 and reservoir 28 to return excess fluid to the reservoir. To prevent an excessive buildup of pressure within conduits 19 and 21 which might otherwise result from the imposition of an excessively large load on the motor, a pair of relief valves 34 and 36 are connected between the two conduits with one valve 34 being oriented to relieve excess pressure from conduit 21 into conduit 19 while the other valve 36 is oriented to relieve excess pressure from conduit 19 to conduit 21.

Pump 12 is coupled to the driving engine 37 of the vehicle and motor 18 is coupled to the wheel drive line 38. Fluid is transmitted to the motor 18 from pump 12 through one of the conduits 19 and 21 and is returned through the other conduit thereby driving the motor which in turn drives the vehicle wheels or the like. The direction of drive is determined by the angle of the pump swash plate 22. In particular, if swash plate 22 is inclined in the direction indicated by arrow 26, then forward drive is transmitted to the wheel drive line 38 in this example, while if the swash plate is inclined in the opposite direction, as indicated by arrow 27, reverse drive results. With the swash plate 22 at right angles to the axis of the pump, no pumping action is produced and the transmission is effectively in neutral. The effective drive ratio through the transmission is determined by the amount of inclination of swash plate 22 in either selected direction. As the swash plate is increasingly inclined away from the neutral position, the volumetric output of pump 12, progressively increases, provided engine speed is constant, and thus the motor 18 must operate at a progressively higher speed.

Although increasing inclination of the swash plate produces progressively greater speed at the output of motor 18, the torque delivered to the wheel drive line 38 undergoes an inverse change. Thus, when the volumetric output of pump 12 is set to be at a minimum value for a given engine speed, motor 18 delivers maximum torque although at a low rotational speed. As the volumetric output of the pump is increased by angling of swash plate 22, motor 18 undergoes a speed increase but the torque delivered to the wheel drive line progressively decreases. Accordingly, swash plate 22 is shifted only slightly away from the neutral position when the vehicle is first starting up and requires high torque but low speed. The swash plate is then shifted further as vehicle speed increases and torque requirement decreases. If the load on the vehicle should increase in the course of operation from starting up an incline for example, then swash plate 22 may be shifted somewhat back toward the neutral position to increase torque. These effects are essentially similar to what is realized in the course of upshifting and downshifting a mechanical transmission although the hydrostatic transmission 11 has the advantage of providing a continuously variable effective drive ratio instead of a limited number of discrete drive ratio steps.

With the foregoing mode of operation in mind, it may be seen that control of the speed and direction of the vehicle, for a given engine speed, is dependent on adjustment of the pump swash plate 22. The operator manipulates a control member such as pivotable lever 39 for this purpose through any of various linkages which may be appropriate to the particular vehicle.

Lever 39 is pivoted to the housing 41 of control valve assembly 42 in this example. Through fluid circuit means to be hereinafter described in more detail, the control valve acts to shift the pump swash plate 22 in one direction in response to the pivoting of control lever 39 in one direction and shifts the swash plate in an opposite direction in response to opposite control lever movement, although under certain circumstances, the control valve assembly overrides the manual control to produce a swash plate movement differing from that called for by the position of lever 39.

To control the swash plate 22, a first fluid actuator 43 has a movable rod 44 pivotably coupled to the swash plate at one side of pivot 23. Rod 44 connects with an internal piston 46 within the actuator and a spring 47 is situated therein to urge the piston towards a centered position at which the swash plate 22 is at the neutral position. By admitting pressurized fluid to the actuator 43 through a conduit 48, the actuator may be caused to extend and to shift the swash plate in the direction indicated by arrow 27 at which reverse drive through the transmission is established. Another similar fluid actuator 49 has a rod 51 pivotably coupled to the swash plate at the other side of pivot 23 and also has an internal spring 52 which urges a piston 53 to the centered position at which swash plate 22 is in the neutral position. A conduit 54 connects actuator 49 with control valve assembly 42 whereby pressurized fluid may be directed to actuator 49 to shift the swash plate 22 in the direction indicated by arrow 26 at which forward drive is established through the transmission. In the absence of fluid pressures in either of conduits 48 and 54 or if fluid pressures therein are balanced, the springs 47 and 52 maintain the pump swash plate in the neutral position.

Control valve housing 41 has a bore 56 with three axially spaced apart annular grooves 57, 58 and 59 in the wall thereof. Grooves 57 and 59 are communicated with actuator conduits 48 and 54 respectively while the center groove 58 receives pressurized fluid from the outlet of pump 29 through a conduit 61, an inching valve assembly 62 to be hereinafter described, and a passage 63 within the valve housing 41. An annular outer valve sleeve or spool 64 is disposed in bore 56 for axial movement therein and has four spaced apart annular lands 66, 67, 68 and 69. With sleeve 66 in what will be termed the neutral position, land 67 is situated midway between grooves 57 and 58 while land 68 is situated midway between grooves 59 and 58. At this neutral position, land 69 is situated between groove 59 and the adjacent end of bore 56 while land 66 is situated between groove 57 and the other end of bore 56. Outer sleeve 64 has an internal axial passage 71 extending along the axis of the sleeve to the position of land 66. The opposite end of the sleeve has a stem 77 which extends across a chamber 72 formed within valve housing 41 into a first centering mechanism 73.

Centering mechanism 73 acts to urge the sleeve 64 towards the above described neutral position. For this purpose, the centering mechanism may have a cylinder 74 threaded into a bore 76 at the end of the valve housing in alignment with bore 56. Stem 77 of sleeve valve 64 is received in cylinder 76 and a compression spring 78 is disposed therein. One end of spring 78 bears against a shoulder 79 formed on stem 77 through a washer 81 while the other end of the spring bears against a flange 82 formed on the end of the stem through another washer 83. With the sleeve 64 at the neutral position, washer 83 abuts a snap ring 84 within cylinder 74. Thus, spring 78 acts to urge the outer sleeve valve 64 towards the neutral position since movement away from that position compresses the spring at one end while movement in the opposite direction compresses the spring at the opposite end.

A smaller diameter inner sleeve valve or spool 86 extends axially into passage 71 of outer sleeve 64 and, except under certain operating conditions to be described, is maintained at a predetermined position relative to the valve housing by a second centering mechanism 87. At that predetermined position, a first land 88 on inner sleeve 86 closes radial passages 89 of the outer sleeve 64 which communicate with groove 59 while a another land 91 of the inner sleeve closes additional radial passages 92 of the outer sleeve which communicate with groove 57 of bore 56. Thus with the two spools 64 and 86 in the above described positions, actuator supply conduits 48 and 54 are blocked from the pressurized fluid conduit 63. Inner sleeve 86 has an axial passage 93 communicating the inner bore 71 of outer sleeve 64 with the opposite end 94 of the valve housing bore 56. End 94 of the valve housing bore 56 is in turn communicated with the reservoir through a drain passage 96.

To form the centering mechanism 87, a stem end 95 of inner sleeve 86 extends into a cylindrical chamber 97 of the housing 41 and through an inwardly extending shoulder 98 therein. A compression spring 99 is disposed coaxially on end 95 of the inner valve sleeve 86 and has one end bearing against an annular washer 101 which reacts against a snap ring 102 and also against the end wall 103 of chamber 97. The opposite end of spring 99 bears against an inwardly extending lip 104 of a cylinder 106 which is disposed coaxially with respect to the spring and which has a flange 107 at the opposite end that seats against a pair of threaded plugs 108 engaged in bores 109 in shoulder 98. A circular disk 111 is secured to the end 95 of inner valve sleeve 86 and is abutted by the lip 104 of sleeve 106. If inner sleeve 86 is shifted away from the above described predetermined position, spring 99 is compressed against either washer 101 or lip 104 depending on the direction of sleeve movement. Thus, the spring 99 establishes a centering force tending to urge the inner sleeve 86 towards the above described pre-determined position. With the outer sleeve valve 64 at the neutral position and the inner sleeve valve 86 at the above described centered position, fluid flow to or from actuators 43 and 49 is blocked except insofar as a flow restriction 112 intercommunicates the actuator supply conduits 48 and 54 for purposes to be hereinafter described.

Figure 2:
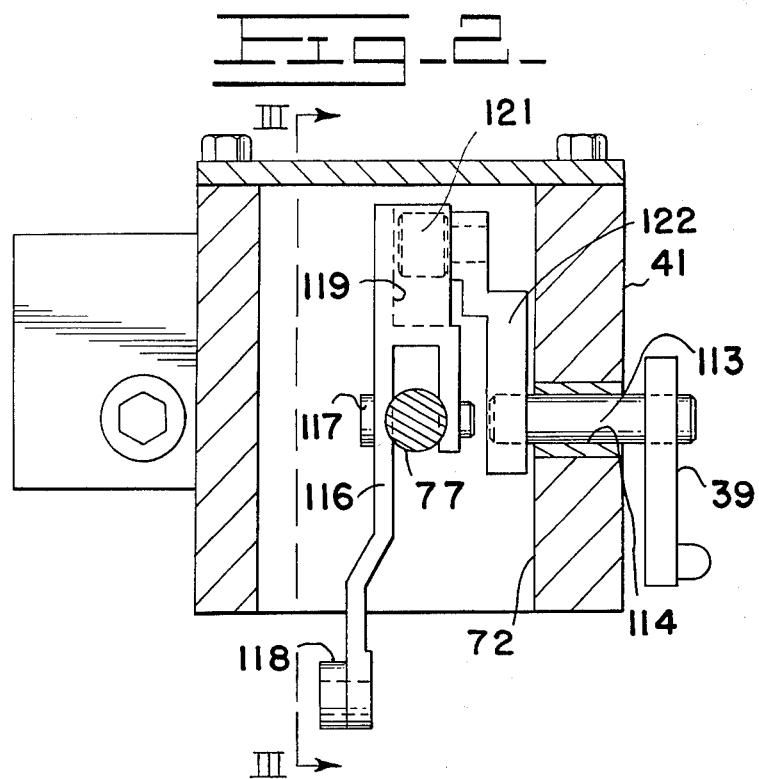
FIG. 2 is a cross section view through a portion of the control valve assembly of FIG. 1 taken along line II—II thereof.
Figure 3:
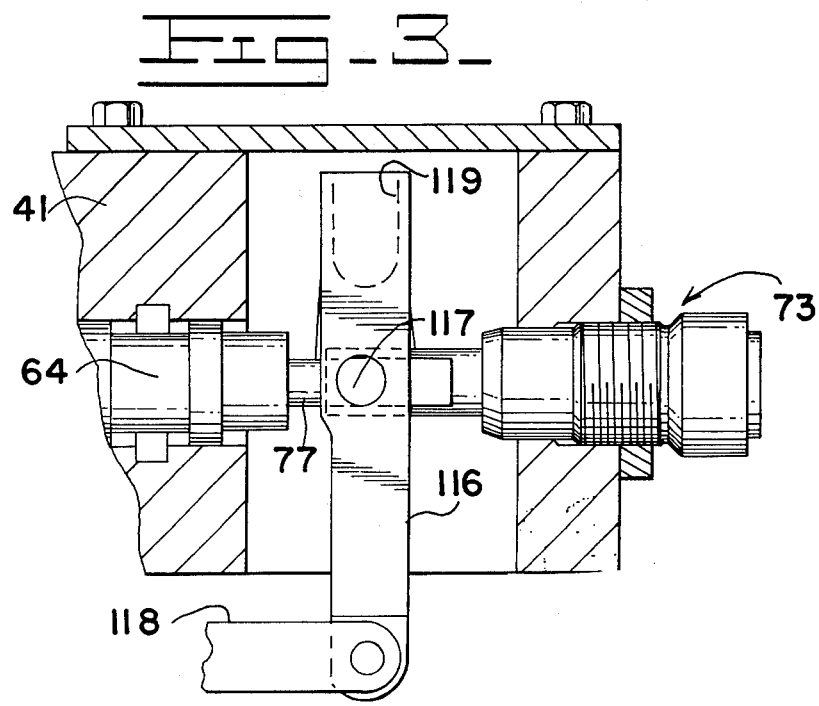
FIG. 3 is a section view of the valve structure of FIG. 2 taken along line III—III thereof.

Considering now the mechanism which causes admission and release of fluid from the actuators 43 and 49 in response to movement of the operator's control lever 39, reference should be made to FIGS. 2 and 3 in conjunction with FIG. 1. Control lever 39 is secured to a pivot axle 113 which extends into chamber 72 of housing 41 through a bore 114 therein. Within chamber 72, a lever 116 has an intermediate portion coupled to outer sleeve stem 77 by a pivot pin 117 and one end of the lever extends out of chamber 72 and is pivotably coupled to a link 118. As illustrated diagrammatically in FIG. 1, link 118 is coupled to one end of the pump swash plate 22 whereby movement of the swash plate is caused to shift the outer valve sleeve 64 through the link 118, lever 116 and stem 77. Referring again to FIGS. 2 and 3, the other end of lever 116 has a slot 119 in which a roller 121 is received. Roller 121 is mounted on an arm 122 that is in turn secured to axle 113. Thus pivoting of the control lever 39 also acts to shift the outer valve sleeve 64 in an axial direction through axle 113, arm 122, roller 121 and lever 117.

In operation, with reference again to FIG. 1, centering mechanisms 73 and 87 act to maintain the transmission 11 in the neutral position depicted in FIG. 1 in the absence of operator initiated movement of control lever 39. Under this condition, pressurized fluid from pump 29 cannot reach either actuator 43 or 49 through the control valve assembly 42 since the valve sleeves 64 and 86 block any fluid flow from groove 58 to grooves 57 and 59. Springs 47 and 52 of the actuators center the pump swash plate 22 and any exchange of fluid between the actuators which is necessary for this purpose may take place through flow restriction 112. If the operator then pivots control lever 39 to initiate forward drive through the transmission, outer valve sleeve 64 is shifted slightly leftwardly as viewed in FIG. 1. This admits pressurized fluid to actuator 49 as such fluid may now flow from groove 58 to groove 59 through radial passages 65 and the interior bore 71 of the outer valve sleeve and may then flow to the actuator 49 through conduit 54. This outer valve sleeve movement also opens a drain passage from the other actuator 43 through conduit 48, groove 57, inner sleeve valve passage 93 and drain conduit 96 of the valve housing. Accordingly, actuator 49 extends and actuator 43 contracts thereby inclining the pump swash plate 22 to cause pump 12 to drive motor 18 with an effective drive ratio determined by the degree of inclination of the swash plate.

If the operator pivots lever 39 in an opposite direction from the neutral position, then outer valve sleeve 64 is shifted in an opposite axial direction and pressurized fluid is admitted to actuator 43 while a drain path is established to actuator 49 causing the swash plate 22 to shift in the opposite direction and establish reverse drive through the transmission.

In the absence of link 118, any degree of movement of the operator's control lever 39 in either direction from the neutral position would cause the pump swash plate 22 to be shifted to the maximum possible extent since the resultant fluid flow into one of the actuators 43 and 49 would simply continue until the actuator was fully extended. Thus the operator would be unable to establish any transmission drive ratio other than the maximum one in a selected direction. This does not occur, since link 118 and the above described associated components provide a follow-up action whereby extension of an actuator 43 or 49 occurs only to an extent determined by the amount of pivoting of control lever 39 which has been made by the operator.

This follow-up action results since as swash plate 22 is shifted in the above described manner, the motion is fed back negatively to the outer valve sleeve 64. The valve sleeve 64 motion caused by shifting of swash plate 22 is in an opposite direction from the operator caused valve sleeve motion which initiated such shifting of the swash plate. Thus, the feedback motion continually attempts to return the outer valve sleeve 64 back to the position at which fluid flow to both actuators 43 and 49 is blocked and actuator extension can continue only while motion of the operator's control lever 39 is continued. The outer sleeve 64 does not return completely to the flow blocking position after the operator stops moving lever 39 but stops just short of such position at the point where fluid flow to the energized actuator is just sufficient to compensate for the leakage flow through orifice 112. Thus as a practical matter, progressive shifting of the pump swash plate 22 continues only as long as the operator is actually pivoting the lever 39 and the inclination of the swash plate is determined by the amount by which the operator has pivoted the control lever, thereby enabling the operator to select the effective drive ratio of the transmission.

Control of vehicle speed with the lever 39 as described above is utilized when the vehicle is travelling at the upper end of the vehicle speed range or when travelling at the low end of the speed range at times when very precise control over vehicle speed may not be necessary. To enable a more precise control of speed at very slow speeds, the previously described inching control valve 62 is utilized. The inching control valve includes an additional valve spool 123 disposed for axial movement within another bore 124 of housing 41 and having one end 126 projecting therefrom for manipulation by the operator through suitable linkage. A compression spring 127 in bore 124 urges spool 123 towards a normal position at which a shoulder 128 on the valve spool abuts an annular housing end member 129 through which spool portion 126 extends. The fluid supply conduit 61 from pump 29 communicates with a first groove 131 in bore 124 and the passage 63 which supplies pressurized fluid to groove 58 is communicated with a spaced apart groove 132 of bore 124. Grooves 131 and 132 are communicated by a groove 133 on spool 123 when the spool is in the above described normal position. Spool groove 133 has metering slots 134 which progressively restrict flow communication between grooves 131 and 132 when the operator shifts spool end 126 against the action of spring 127 to throttle fluid flow through the control valve.

To obtain precise control over the pump swash plate movement, inching valve spool 123 is shifted to the left to block pressurized fluid from groove 58 and control lever 39 is then positioned at the desired speed setting. Spool 123 is then slowly shifted back to the right to meter fluid to the actuators in a precisely controllable manner. Inching valve 62 may also be used to stop fluid motor 18 regardless of the position of lever 39. By moving spool 123 to the left fluid flow to the actuators is completely stopped. As fluid can be exchanged between actuators 43 and 49 through flow restriction 112, springs 47 and 52 restore the swash plate 22 to the neutral position. This is useful if the control lever 39 is also coupled to the engine throttle as it enables the engine to be speeded up, if desired, without motion of the vehicle.

In many instances, the lever 39 which is pivoted by the operator to select vehicle direction and to control vehicle speed may also be directly linked to the throttle, governor rack or other speed control of the engine 37 so that engine speed is increased or decreased as the effective drive ratio of the transmission 11 is increased or decreased. In other instances, engine speed may be independently controlled or the engine may be normally operated at a constant speed with changes of vehicle speed being controlled solely by varying the drive ratio of the transmission. In either case, a problem can arise if the vehicle is subjected to an increased load such as is usually present when the vehicle is first being started up from the stationary condition or which may occur when the vehicle is travelling up an inclined surface or when heavy materials are placed on the vehicle for transportation. Under increased loading, the vehicle will tend to slow down or will not accelerate at the normal rate. When this occurs, the natural tendency of many operators is to shift the control lever 39 in the direction which would normally increase the speed of the vehicle. This is the normal response of a person accustomed to operating an automobile. If an automobile slows, because of starting up an inclined surface for example, one depresses the accelerator pedal further. But in a hydrostatic transmission vehicle, movement of the operator's lever 39 in the direction which normally would increase speed is in fact undesirable when load increases severely. The reason for this is that such movement increases the drive ratio through the transmission or, in effect, upshifts the transmission when the situation actually calls for decreasing the drive ratio to produce an effect comparable to downshifting a mechanical automotive type transmission. While an operator can be advised of the preferable movements of lever 39 under increased loading conditions, considerable training is necessary to condition him to do the opposite of what is done in other forms of vehicles and errors in this respect may still occur on occasion. It is therefore desirable to provide a load compensating means 136 which avoids this problem by overriding the operator's manipulation of control lever 39 when load conditions make that desirable.

The load compensating means 136 coacts with the previously described elements of centering mechanism 87 to shift the position of the inner sleeve valve 86 when severe loading occurs. For this purpose, slidable cylinder pins 137 extend from the previously described centering mechanism bores 109 to contact the adjacent side of disk 111 and a conduit 138 communicates each such bore with the conduit 21 which interconnects the pump and motor. An additional pair of similar cylinder pins 139 extend from bores 141 at the opposite side of chamber 97 to contact the opposite side of the disk 111. Still another flow conduit 142 communicates each of bores 141 with the other conduit 19 that couples the pump and motor.

Accordingly, a fluid pressure obtained from conduit 21 acts against disk 111 through pins 137 in a direction tending to shift inner sleeve valve 86 rightwardly as viewed in FIG. 1 while a fluid pressure obtained from conduit 19 acts against the disk in an opposite direction through pins 139. When the load on the vehicle is below a predetermined high value, the fluid pressures acting against opposite sides of the disk 111 are insufficient to overcome the centering force of spring 99 and the load compensating mechanism 136 does not affect operation of the system. However, if the fluid pressure in motor conduit 19 for example, should exceed the predetermined value because of increased loading imposed on the motor 18, disk 111 and valve spool 86 are shifted leftwardly as viewed in FIG. 1. Pressurized fluid from groove 58 may then flow through passage 65 and past land 91 to actuator supply conduit 48. Simultaneously, a drain passage for actuator supply conduit 54 is created past land 88. Actuator 43 then shifts swash plate 22 closer to the neutral position thereby reducing the volumetric output of pump 12. This increases the torque output of motor 18 without requiring increased power input to the pump from engine 37.

As the angle of swash plate 22 is changed in this manner, the motion is negatively fed back to outer valve sleeve 64 through the link 118 and other follow-up linkage previously described to re-establish a metered flow of fluid to actuator 49 through groove 59 and conduit 54. The movement of the inner valve sleeve 86, accompanied by the follow-up movement of outer valve sleeve 64 continues until the pressure in motor conduit 19 ceases rising either because the load on the vehicle is stabilized or relief valve 36 opens. When the load subsequently decreases and the fluid pressure in motor conduit 19 drops, spring 99 is able to return the inner valve sleeve 86 to the position which it occupied prior to the load increase and fluid is transmitted to actuator 43 to restore the swash plate 22 and the effective drive ratio through the transmission to the condition which existed prior to the load increase and which was determined by operator selection through lever 39.

If the load increase should occur while the vehicle is being operated in reverse, the resultant fluid pressure rise occurs in conduit 21 rather than conduit 19. Disk 111 and inner valve spool 86 are shifted in the opposite or rightward direction as viewed in FIG. 1 and the angle of swash plate 22 is again decreased for the duration of the excess load as pressurized fluid is then directed to actuator 49 past land 88 while a drain passage for actuator 46 is established past land 91, the action being essentially similar to that described above with reference to a load increase while operating the forward drive direction.

Variations in the specific structure are possible while retaining the basic elements and methods of operation of the invention. For example, as depicted in FIG. 4, the functions of the outer and inner valve sleeves 64' and 86' may be interchanged by interchanging the control connections to such valve sleeves. The modified control valve assembly 42' of FIG. 4 may be identical to that previously described except insofar as inner sleeve 86' is no longer coupled to the second centering mechanism 87' and load compensating means 136' but is instead coupled to the first centering mechanism 73' and to the operator's control lever 39' through axle 113', arm 122', roller 121', and lever 116', all of which elements may be identical to the corresponding elements previously described. The outer valve sleeve 64' is now coupled to disk 111' and second centering mechanism 87'.

This end to end reversal of the outer and inner valve sleeves 64' and 86' and the reversal of the operative connections thereto does not alter the basic operation of the control valve in substance. Thus, operator initiated movement of lever 39' in one direction shifts inner valve sleeve 86' leftwardly as viewed in FIG. 4 establishing a flow path from pressurized fluid groove 58' to groove 57' while opening a drain path to groove 59' just as occurred in the previously described embodiment. Similarly, a pivoting of lever 39' in the opposite direction shifts inner valve sleeve 86' to transmit pressurized fluid from groove 58' to actuator supply line 54' while opening a drain path to the other actuator supply line 48' just as occurred in the first described embodiment. The feedback motion received at the control valve assembly through link 118' restores the inner valve sleeve 86' to the original position after motion of the lever 39' stops except for allowing for a small fluid flow just sufficient to compensate for the exchange of fluid between the actuator supply conduits 48' and 54', again in a manner identical to that previously described. Should loading on the transmission motor increase to the point where a predetermined pressure differential exists between conduits 138' and 142', cylinder pins 137' or 139' acting against disk 111' shift the outer valve sleeve 64' to reduce the effective drive ratio through the transmission, in the manner previously described.

While the invention has been described with respect to certain preferred embodiments, it will be apparent that many other modifications are possible and it is not intended to limit the invention except as defined in the following claims.

What is claimed is:

1. A control system for a hydrostatic transmission which has a fluid pump driving a fluid motor through a pair of flow conduits extending therebetween wherein said pump has an element which is movable to vary the volumetric displacement thereof, said control system comprising:
fluid actuator means coupled to said pump element for varying said pump displacement in response to pressurized fluid received by said actuator means,
a control member movable by an operator to select pump displacement,
valve means movable in a first direction in response to movement of said control member to transmit pressurized fluid to said actuator means,
follow-up means connected between said pump element and said valve means for shifting said valve means in a second opposite direction in response to movement of said pump element resulting from movement of said valve means in said first direction, and
load compensating means for shifting said valve means independently of said control member when the fluid pressure differential between said flow conduits reaches a predetermined value.

2. The combination defined in claim 1 wherein said valve means comprises
a housing having a bore therein with means for receiving pressurized fluid at a first portion of said bore and means at a second portion of said bore for transmitting fluid to said actuator means,
an annular outer valve member disposed coaxially in said bore for axial movement therein and an annular inner valve member disposed coaxially in said outer valve member for axial movement therein,
resilient means urging said outer and inner valve members towards predetermined positions within said bore at which said valve members jointly block fluid flow from said first portion of said bore to said second portion thereof,
means coupling said control member and said follow-up means to one of said valve members, and
means coupling said load compensating means to the other of said valve members.

3. The combination defined in claim 2 wherein said control member and said follow-up means are coupled to said outer valve member and said load compensating means is coupled to said inner valve member.

4. The combination defined in claim 2 wherein said control member and said follow-up means are coupled to said inner valve member and said load compensating means is coupled to said outer valve member.

5. The combination defined in claim 1 further comprising an inching valve for selectively throttling the flow of pressurized fluid to said valve means.

6. The combination defined in claim 1 wherein said pump element has a neutral position at which said pump displacement is zero and is movable therefrom in one direction to progressively increase pump displacement in a forward drive mode and is movable therefrom in an opposed direction to progressively increase pump displacement in a reverse drive mode, and wherein said actuator means shifts said element in said one direction in response to pressurized fluid received through a first supply conduit and shifts said element in said opposed direction in response to pressurized fluid received through a second supply conduit, and wherein said valve means transmits pressurized fluid to said first supply conduit in response to movement of said control member in one direction and transmits pressurized fluid to said second supply conduit in response to movement of said control member in an opposite direction.

7. The combination defined in claim 6 wherein said valve means provides a drain path to said second supply conduit while transmitting pressurized fluid to said first supply conduit and provides a drain path to said first supply conduit while transmitting fluid to said second supply conduit.

8. The combination defined in claim 6 further comprising means forming a constricted flow path between said first and second actuator supply conduits.

9. The combination defined in claim 8 further comprising resilient means urging said pump element towards said neutral position thereof.

10. The combination defined in claim 1 wherein said valve means comprises
a housing having a bore therein and having means for receiving pressurized fluid at a central portion of said bore, means for transmitting fluid from one end portion of said bore to said actuator means to shift said pump element in a first direction, and means for transmitting fluid from the other end portion of said bore to said actuator means to shift said pump element in the opposite direction,
an outer valve sleeve disposed coaxially in said bore and having a stem extending from one end thereof, and an inner valve sleeve disposed coaxially in said outer valve sleeve and having a stem extending from said other end of said bore, said outer and inner valve sleeves having centered positions in said bore at which said sleeves jointly isolate said central portion of said bore from both of said end portions thereof,
first centering spring means coupled to said stem of said outer valve sleeve for urging said outer sleeve towards said centered position thereof,
second centering spring means coupled to said stem of said inner valve sleeve for urging said inner sleeve towards said centered position thereof,
means for shifting one of said sleeves away from said centered position thereof in response to movement of said control member, and wherein
said follow-up means shifts said one sleeve back towards said centered position thereof in response to movement of said pump element resulting from movement of said one sleeve by said control lever, and wherein
said load compensating means shifts the other of said sleeves away from said centered position thereof in response to said fluid pressure differential between said flow conduits.

11. The combination defined in claim 10 wherein the one of said centering spring means which is coupled to said other valve sleeve includes an element extending radially from said stem of said other sleeve, and wherein said load compensating means comprises means exerting opposed first and second forces against said radially extending element of said one centering spring means, said first force being proportional to the fluid pressure in one of said flow conduits and said second force being proportional to the fluid pressure in the other of said flow conduits.

12. A control system for a hydrostatic transmission which has a reversible variable displacement fluid pump driving a fluid motor through a pair of flow conduits interconnected therebetween, said pump having an element which is shiftable to vary said displacement thereof, said control system comprising:

first and second fluid actuators coupled to said element of said pump for shifting said element in opposite directions in response to pressurized fluid, said actuators having spring means for shifting said element to the position at which the displacement of said pump is zero in the absence of pressurized fluid at either of said actuators, a valve housing having a bore communicated with a pressurized fluid inlet, a drain outlet and first and second actuator fluid supply conduits coupled to said first and second actuators respectively, a control member shiftable by an operator to vary said displacement of said pump, a first valve sleeve in said bore of said housing for communicating said first actuator supply conduit with said inlet while communicating said second actuator supply conduit with said drain in response to movement of said control member in a first direction and for communicating said second actuator supply conduit with said inlet while communicating said first actuator supply conduit with said drain in response to movement of said control member in the opposite direction, follow-up means for feeding back movement of said pump element to said first valve sleeve to return said first valve sleeve toward the initial position thereof, and a load compensating second valve sleeve disposed in said bore of said housing in coaxial relationship with said first sleeve for transmitting pressurized fluid from said inlet to one of said actuators while communicating the other of said actuators with said drain when the fluid pressure difference in said conduits reaches a pre-determined value whereby the displacement of said pump is decreased independently of said control member when said pressure differential between said conduits is reached.

* * * * *